US006799972B1

(12) United States Patent
Summar

(10) Patent No.: US 6,799,972 B1
(45) Date of Patent: Oct. 5, 2004

(54) ABSTRACT ARTWORK AND APPARATUS FOR MAKING SAME

(76) Inventor: Michael A. Summar, 673 Watson Branch Dr., Franklin, TN (US) 37064

( * ) Notice: Subject to any disclaimer, the term of this patent is extended or adjusted under 35 U.S.C. 154(b) by 0 days.

(21) Appl. No.: 10/443,914

(22) Filed: May 22, 2003

Related U.S. Application Data

(63) Continuation of application No. 10/092,286, filed on Mar. 5, 2002, now Pat. No. 6,595,777.

(60) Provisional application No. 60/276,802, filed on Mar. 16, 2001.

(51) Int. Cl.[7] .................................... G09B 11/10

(52) U.S. Cl. .................................... 434/84; 434/81

(58) Field of Search .................................... 434/81, 84, 90; 118/300, 313; 264/78

(56) References Cited

U.S. PATENT DOCUMENTS 4,169,323 A 10/1979 Engel
4,651,993 A 3/1987 Netsch, Jr.
4,683,836 A 8/1987 West
4,767,584 A 8/1988 Siler
4,928,625 A 5/1990 Woods
5,672,057 A 9/1997 Engel

OTHER PUBLICATIONS

"No. 23" Jackson Pollock, 1948, Tate Gallery, London, Kenneth Jameson, *Starting with abstract painting*; Watson-Guptill Publications, New York, New York, 1970, p. 61.

*Primary Examiner*—Kurt Fernstrom
(74) *Attorney, Agent, or Firm*—Richard L. Marsh

(57) ABSTRACT

A method of producing abstract artwork comprises the steps of mounting a substrate to be painted upon a frame, placing the frame with the substrate thereon in an airstream, passing an airstream through a defined tunnel, defining a venturi adjacent one end of the tunnel, disposing a plurality of discharge ports across a venturi passage of the tunnel in a low pressure zone thereof, selectively allowing a medium from at least one of the discharge ports to be picked up by the airstream whereby the airstream carries the medium from the discharge port to the substrate wherein the substrate receives the medium thereupon thus creating abstract artwork.

20 Claims, 3 Drawing Sheets

ABSTRACT ARTWORK AND APPARATUS FOR MAKING SAME

CROSS REFERENCE TO RELATED APPLICATIONS

This application is a continuation of Applicant's application Ser. No. 10/092,286 filed on 5 Mar. 2002 now U.S. Pat. No. 6,595,777, which is a non-provisional application of provisional application 60/276,802 filed on Mar. 16, 2001.

BACKGROUND OF THE INVENTION

1. Field of the Invention

This invention relates to a method of making abstract artworks and an apparatus therefor. The apparatus and method are particularly suited for creating works of abstract art by the passage of air created by a celebrity driver in an auto race.

2. Prior Art Statement

Abstract artwork has all the features of representational art in any form, that is, sensitive to color, line, texture, shape, form, tone and pattern. Various means of producing abstract artworks have been attempted in the past. Many reference books are available on the subject.

It is known to produce and abstract painting by allowing paint to drip through holes disposed in the bottom of a can. For instance, see the painting "Number 23" by Jackson Pollock, 1948 in the Tate Gallery, London, found in Kenneth Jameson, *Starting with abstract painting* Watson-Guptill Publications, New York, N.Y., 1970, pp 61.

It is also known to provide a series of parallel, adjacent tubes which are filled with flowable colored sand to create a pattern pleasing to the eye of the individual, in effect, abstract painting. For instance, see the U.S. Pat. No. 4,169,323 issued on Oct. 2, 1979 to Robert W. Engel. Furthermore, there is a similar device on the market which has at least two different colors of flowable sand captured between two transparent plates which when moved, change the shape of the flowable sand creating a new abstract painting.

It is further known to provide a game of creating "abstract art" using defined, well recognizable shapes. For instance, see U.S. Pat. No. 4,651,993 issued on Mar. 24, 1987 to Walter A. Netsch, Jr.

Peter West, in his U.S. Pat. No. 4,683,836 issued on Aug. 4, 1987 uses and apparatus to guide a high pressure air brush to produce a painting having defined structure and line as the air brush is controlled along a preselected path to create the art work. High pressure air is used instead of flow of a naturally occurring air stream.

Additionally, it is known to produce a design pattern on a material comprising the steps of applying a selected medium to selected portions of the material, positioning the material against a surface of a template and holding the material against the template at a selected pressure. The pattern may not be predictable and may, in fact, be random. For instance, see the U.S. Pat. No. 4,767,584 issued on Aug. 30, 1988 to Todd L. Siler.

Yet another known apparatus for painting unique abstract designs using pendulum motion is shown in U.S. Pat. No. 4,928,625 issued on May 29, 1990 to William A. Woods. An operator of the apparatus initiates the motion and may select different colors during the operation.

Finally, it is known to produce an art form using a spinning disc. For instance, see the U.S. Pat. No. 5,672,057 issued on Sep. 30, 1997 to Robert W. Engel.

SUMMARY OF THE INVENTION

It is believed by the inventor of the instant invention that there exists a need for abstract art created by random placement of paint upon a substrate to be painted and especially art created by an act of a person controlling an animal or vehicle. Therefore, it is an object of this invention to provide a method of creating abstract artwork using vortices from an artificially created air-stream, the air stream passed through a venturi, wherein the venturi has at least one paint discharge port disposed in a low pressure zone immediately after the venturi wherein the air stream passing through the venturi carries at least a portion of the paint therealong toward a substrate to be painted.

Yet another object of this invention is to provide a method of producing abstract artwork comprising the steps of mounting a substrate to be painted upon a frame, placing the frame with the substrate thereon in an airstream, the airstream previously directed through a defined tunnel, a plurality of disposal ports arranged across a venturi passage of the tunnel, the disposal ports having a medium selectively emanating therefrom, the airstream carrying the medium from the disposal ports to the substrate.

Still another object of this invention is to provide a method of producing abstract artwork comprising the steps of mounting a substrate to be painted upon a frame, placing the frame with the substrate thereon in an airstream, the airstream previously directed through a defined tunnel, a plurality of disposal ports arranged across a venturi passage of the tunnel, the disposal ports having at least one medium selected from the group comprising paint, particulate matter, glue, fluid elastomeric substances emanating from the disposal ports, the airstream carrying the medium from the disposal ports to the substrate.

A feature of this invention is to provide abstract artwork created by an air stream passing through a venturi thereby picking up at least one medium to be carried along with n the air stream wherein the air stream is created by a celebrity person controlling an animal or vehicle such as at a race track.

Another feature of this invention is to provide abstract artwork by placing an inlet port of a wind chamber through, over and/or under a retaining wall of a race track wherein the inlet port captures an air stream created by an entity, for instance, a person controlling an animal or a vehicle, in particular a celebrity person, wherein a substrate to be painted is affixed with a specific time corresponding to the instant the air stream created by that entity enters the inlet port of the wind chamber.

An additional feature of this invention is to provide abstract artwork by placing an inlet port of a wind chamber through, over and/or under a retaining wall of a race track wherein the inlet port captures an air stream carries a medium toward a substrate to be painted wherein the substrate may be a canvas, cloth, paper, metallic, thermoplastic or other paintable substrate.

Still another feature of this invention is to provide abstract artwork by placing an inlet port of a wind chamber through, over and/or under a retaining wall of a race track wherein the inlet port captures an air stream carries a medium toward a substrate to be painted wherein the substrate is mounted upon a frame work and wherein the framework having the substrate mounted thereupon may be moved while the air stream is picking up and carrying the medium toward the substrate to be painted.

An auxiliary object of this invention is to provide an apparatus for producing abstract artwork comprising a frame for mounting a substrate to be painted thereupon and a tunnel of a predetermined shape, the tunnel comprising an inlet port for disposing in a direction of an air stream, a venturi passage having a plurality of disposal ports arranged across the venturi passage in a low pressure zone thereof and an outlet wherein the plurality of disposal ports each has a medium associated therewith adapted to pass through the respective disposal port and wherein the frame is positioned adjacent the outlet.

An attribute of this invention is to provide an apparatus for producing abstract artwork comprising a frame for mounting a substrate to be painted thereupon and a tunnel of a predetermined shape, the tunnel comprising an inlet port for disposing in a direction of an air stream, a venturi and an outlet wherein the inlet may be provided with an air dam to be opened at a precise moment to capture a particular portion of an air stream created by an entity passing in front of the inlet wherein the entity is a person controlling an animal or a vehicle, in particular, a celebrity person, the air dam closed after the air stream created by the entity has been captured.

Another attribute of this invention is to provide an apparatus for producing abstract artwork wherein an operator of the apparatus records the name and the time an entity passed in front of the apparatus wherein the entity is a person controlling an animal or a vehicle, in particular a celebrity person.

Yet another attribute of this invention is to provide an apparatus for producing abstract artwork comprising a frame for mounting a substrate to be painted thereupon and a tunnel of a predetermined shape, the tunnel comprising an inlet port for disposing in a direction of an air stream, a venturi and an outlet wherein the venturi has a plurality of disposal ports arranged across the venturi passage in a low pressure zone thereof and wherein at least one of the disposal ports is moved rotationally and/or orthogonally while an air stream created by an entity such as a celebrity person controlling a vehicle or animal passes in front of the inlet port.

A significant object of this invention is to produce a work of abstract art by removably affixing an apparatus comprising a frame for holding a substrate, an inlet port, an outlet port to a vehicle adapted to be moved through the atmosphere, the apparatus having a venturi between the inlet port and the outlet port, the venturi passage having a plurality of disposal ports arranged across a low pressure zone thereof wherein the plurality of disposal ports each have a medium associated therewith adapted to pass through the respective disposal port and wherein an airstream created by the passage of the vehicle through the atmosphere is directed through the apparatus picking up medium from the disposal ports and depositing at least a portion thereof on the substrate.

Another additional feature of this invention is to produce abstract artwork by placing an apparatus comprising a frame for holding a substrate, an inlet port, an outlet port in a wind tunnel, the inlet port and outlet port having a venturi therebetween, wherein the inlet port captures a portion of the airstream of the wind tunnel therein and carries a medium exuding from a plurality of discharge ports disposed in a low pressure zone of the venturi toward a substrate to be painted wherein the wind tunnel may also have a vehicle to be tested disposed therein.

Still another feature of this invention is to produce abstract artwork by placing a substrate mounted upon a frame of a painting apparatus in a wind tunnel along with a vehicle to be tested, the painting apparatus comprising an inlet port and an outlet port having a venturi therebetween, wherein the inlet port captures a portion of the airstream of the wind tunnel therein and carries a medium exuding from a plurality of discharge ports disposed in a low pressure zone of the venturi toward the substrate wherein the vehicle to be tested has an airstream deflecting protrusion adjacent the inlet port of the apparatus.

DESCRIPTION OF THE PREFERRED EMBODIMENTS

While the various features of this invention are hereinafter described and illustrated as abstract artwork created by disposing at least one material carried by an airstream upon a substrate to be painted wherein the substrate is exposed to the airstream for a defined period of time, it is to be understood that the various features of this invention can be used singly or in various combinations thereof in abstract artwork, a method of making abstract artworks, an apparatus for making the abstract artworks and methods of making the apparatus, as can hereinafter be appreciated from a reading of the following description.

Figure 1:
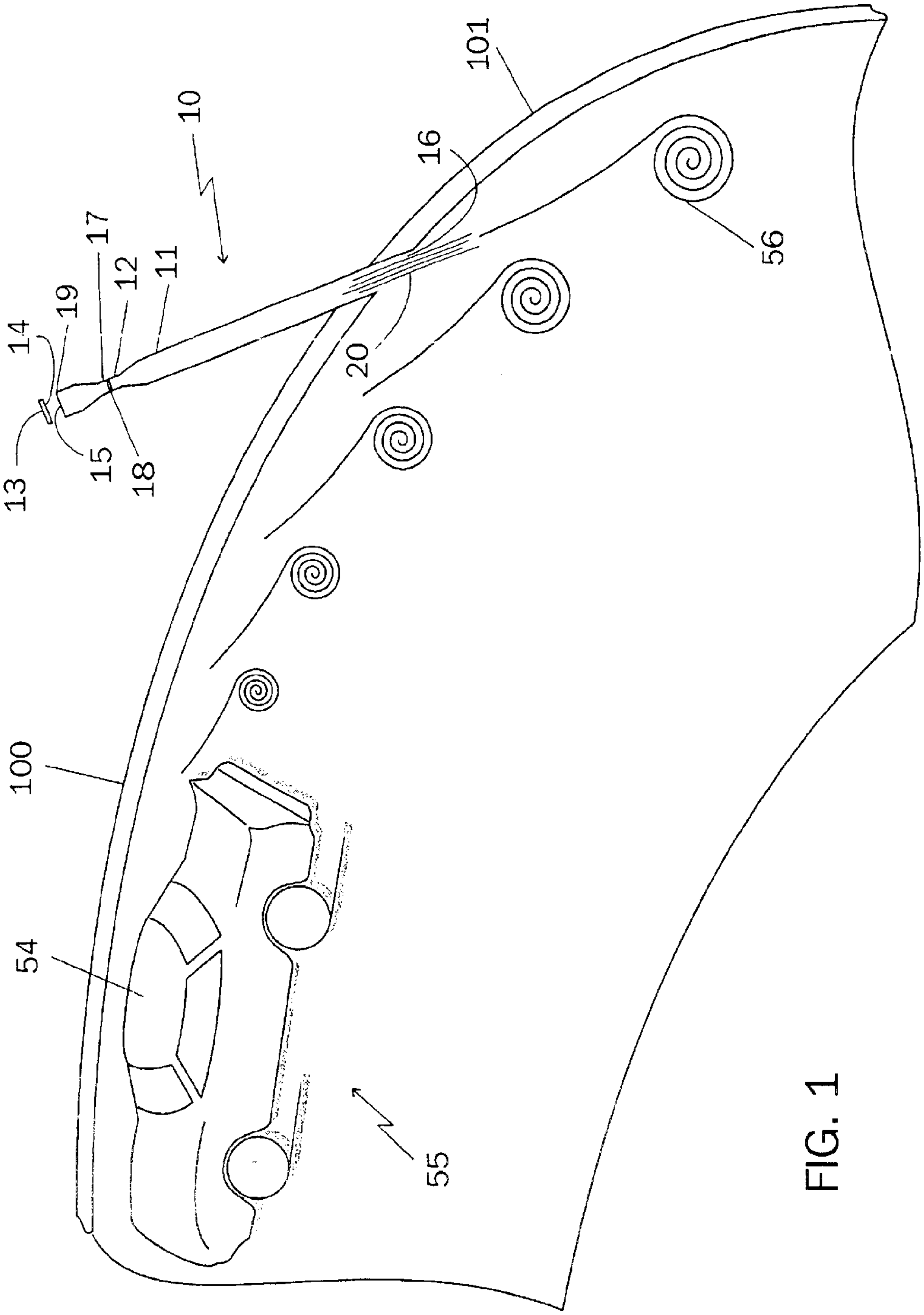
FIG. 1 is a top plan view of an embodiment of the apparatus of this invention shown disposed in a retaining wall of a race track.

Referring now to FIG. 1 an apparatus used in a method of creating abstract artwork of this invention is generally shown by the numeral 10. Apparatus 10 comprises a tunnel 11 having an inlet end 16 and an outlet end 15, inlet end 16 adapted to be inserted into an opening in a wall 101 on the curve of a racing track 100 or supported in alignment with a tangent to the curve of race track 100 where no wall structure appears. Though preferably apparatus 10 is used tangent to a curve on race track 100, other arrangements are contemplated within the scope of this invention. For instance, inlet end 16 may be directed into a naturally occurring airstream 20 such as a stiff breeze, installed at an angle to the straight portion of a race track or placed in the airstream 20 of an air movement device, these examples recited here though this invention is not limited only thereto. For instance, the naturally occurring airstream 20 may be created by an entity 55 passing through the environment such as horses racing on a track, airplanes passing overhead, aircraft preparing for takeoff, flocks of birds flying past or another animal or vehicle 54 capable of creating an airstream 20 by passage through the atmosphere or generating the airstream 20 by an internal process. The method of this invention of creating abstract artwork comprises the steps of placing a substrate 14 to be painted in a directed airstream 20', wherein an undirected airstream 20 has entered an inlet of a tunnel 11, passed through tunnel 11 of apparatus 10, tunnel 11 containing a venturi 12, disposing at least one discharge port 18 for a medium to be used in creating the abstract artwork in a low pressure zone 17 of venturi 12, passing undirected airstream 20 through venturi 12 wherein flow from directed airstream 20' carries at least a portion of the medium emanating from at least one discharge port 18 therealong toward substrate 14 to be painted wherein the medium is deposited on substrate 14. In the method of this invention, abstract artwork is created by the steps of mounting a substrate 14 to be painted upon a frame 13, placing frame 13 with substrate 14 thereon adjacent an end 19 of a tunnel 11, passing an undirected airstream 20 through defined tunnel 11, establishing venturi 12 adjacent one end 19 of tunnel 11, disposing a plurality of discharge ports 18 across venturi 12 of tunnel 11, selectively allowing a medium from at least one of discharge ports 18 to be picked up by directed airstream 20', directed airstream 20' carrying the medium from discharge port 18 to substrate 14 and substrate 14 receiving the medium thereupon. Thereafter, substrate 14 may be removed from frame 13 allowing the medium deposited thereon to become permanent whereafter substrate 14 may be presented as abstract artwork. Substrate 14 may optionally be left upon frame 13 and again, or repeatedly, placed in directed airstream 20' for application of additional medium thereon as desired by the artist/operator of apparatus 10 and method of this invention.

Figure 2:
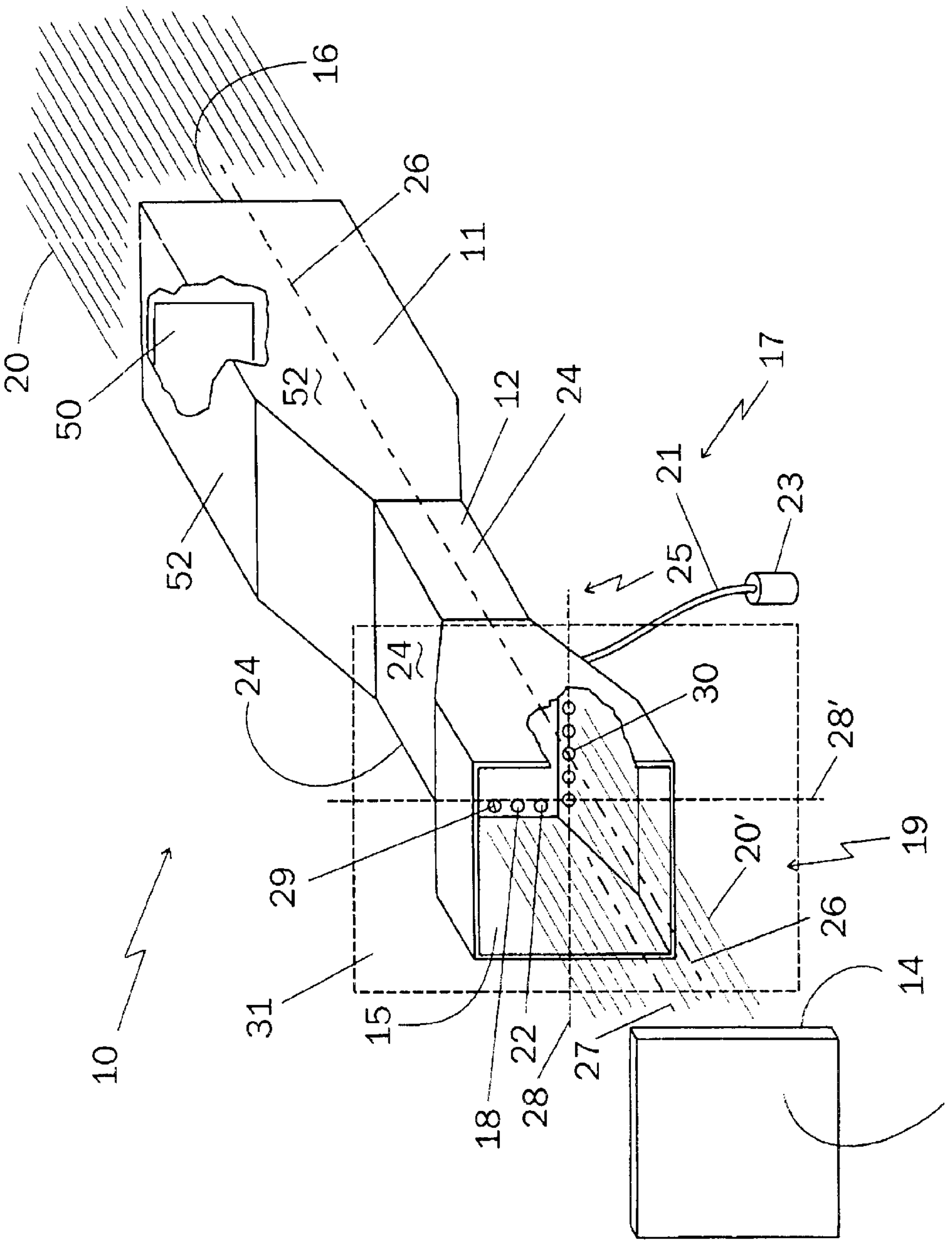
FIG. 2 is a perspective view, partially broken away, of the preferred embodiment of the apparatus of this invention showing discharge ports in the venturi.

Referring also to FIG. 2, generally, each discharge port 18 is adapted to have only one medium picked up by directed airstream 20' wherein the medium is selected from group comprising liquid paints, solid colorants, particulate matter, moisture, fuels, lubricants and/or waste materials. Furthermore, undirected airstream 20 may have airborne particulate matter, moisture, fuels or lubricants carried therein, these materials contributing to the abstract artwork created by the method of this invention. Preferably, each discharge port 18 is individually controlled by an operator of apparatus 10 whereby selected discharge ports 18 may be turned on or off using a valve 29 as desired thereby introducing the art elements of color and texture to the abstract artwork being created on substrate 14. Thus, each discharge port 18 has a supply tube 21 and valve 29 associated therewith, supply tube 21 being disposed in a container 23 containing the desired medium for that discharge port 18 therein and valve 29 disposed in supply tube 21 for controlling the flow of medium through supply tube 21. Though valve 29 is shown as being disposed at a discharge end 30 of discharge port 18, valve 29 could be disposed anywhere within supply tube 21 to accomplish the purpose of controlling the flow of medium therethrough. The type or style of a valve used for valve 29 may be selected for different types of medium and thus the construction of valve 29 is not recited here.

It is readily apparent from FIG. 2, that discharge ports 18 may be disposed on any wall 24 of low pressure zone 17 of venturi 12 thus introducing selected medium to directed airstream 20' from different orthogonal directions. Each discharge port 18 has a port location 22 disposed through wall 24 wherein discharge port 18 may be inserted. Port locations 22 are shown arranged in a single row 25 circumscribing low pressure zone 17 though it should be fully understood that port locations 22 may be arranged in multiple rows 25, randomly or in another array without departing from the scope of this invention. As port locations 22 are arranged through walls 24, discharge ports 18 are adapted to be inserted therethrough or, after insertion, withdrawn therefrom and thus, any one discharge port 18 may be moved during a period of time when undirected airstream 20 is passing into inlet end 16 and thus directed through venturi 12. In this manner, the artist/operator of apparatus 10 may introduce additional elements of artistic ability by changing one or more discharge ports 18 wherein each of these discharge ports 18 is connected to a different medium contained in different containers 23 through separate supply tubes 21. As each discharge port 18 may have a different medium picked up therefrom by the low pressure created in low pressure zone 17, the various colors and textures of the materials recited above may be introduced to a single abstract artwork by the artist/operator. For instance, at least one discharge port 18 may be moved along a horizontal axis 28 and/or along a vertical axis 28' of a plane 31 that is disposed transverse to an axis 27 of directed airstream 20', axis 27 of directed airstream 20' generally lying parallel to axis 26 of tunnel 11. Plane 31 is generally disposed through an orthogonal array of port locations 22 in low pressure zone 17 though it is fully understood here that plane 31 may also be disposed at an angle to axis 27 of directed airstream 20' and thus plane 31 may be rotated about either or both of axes 28, 28' thus defining additional port locations 22 for discharge ports 18 in low pressure zone 17. As port locations 22 may be disposed through any of walls 24 at substantially any location within low pressure zone 17, at least one discharge port 18 may be moved orthogonally along axis 28, 28' at any angle to axis 27 of directed airstream 20' including but not limited to horizontally and directly perpendicular to axis 27, vertically and directly perpendicular to axis 27, horizontally and parallel to axis 27 or any combination thereof. Additionally, though it is preferred that discharge ports 18 are disposed within low pressure zone 17 and generally have the medium picked up from the discharge end 30 of discharge port 18, discharge ports 18 could also have the medium forced therefrom through discharge end 30 introducing another element of artistic ability. When forcing medium through discharge end 30 of discharge port 18, the amount of force may also be varied throughout the process of creating one abstract artwork wherein the amount of force may be varied from just enough to permit the medium to exude from discharge end 30 to the amount of force required to spray a stream of medium from discharge port 18.

Optionally, as discharge ports 18 are adapted to be moved into or out of port locations 22, at least one discharge port 18 may be withdrawn from its respective port location 22 as directed airstream 20' passes through low pressure zone 17 thus varying the amount of medium to be picked up from that respective discharge port 18. Similarly, at least one discharge port 18 may be inserted further into directed airstream 20' allowing a greater amount of medium to be carried by directed airstream 20'. In these two alternatives, discharge port 18 is moved along either horizontal axis 28 or vertical axis 28', in a direction transverse to axis 27 of directed airstream 20' though the movement along horizontal axis 28 or vertical axis 28' is though a single port location 22. It is anticipated by the instant inventor that each discharge port 18 is of sufficient length to be inserted fully through wall 24 to a distance substantially equal to the width or breadth of low pressure zone 17. In another alternative, at least one discharge port 18 may be replaced by another discharge port 18 having a different orifice diameter in the discharge end 30 thereof again varying the amount of medium to be picked up by directed airstream 20'. Movement of discharge ports 18 may be effected prior to entrance of undirected airstream 20 into inlet end 16 or may occur during traverse of airstream 20 through tunnel 11.

Figure 3:
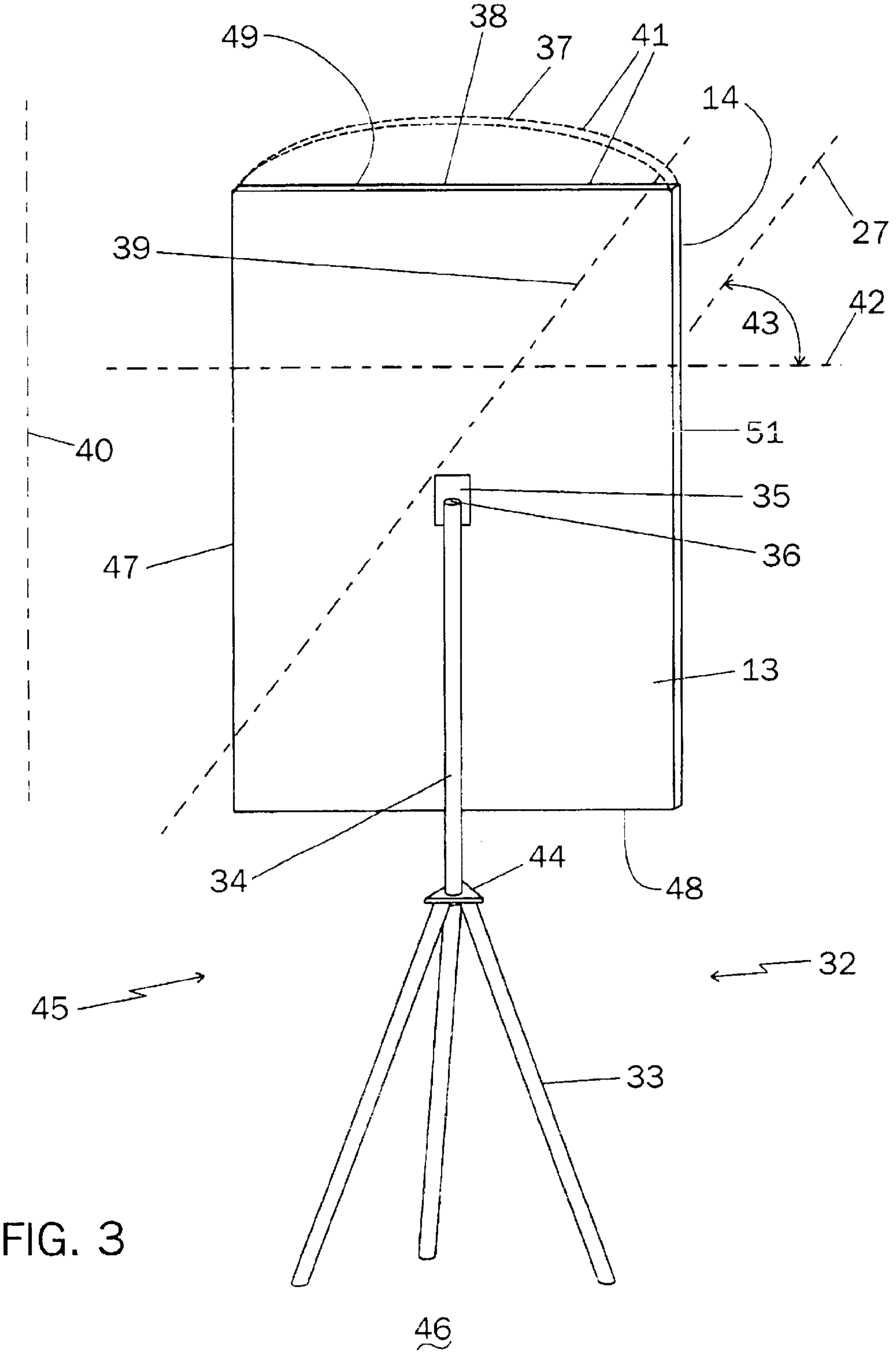
FIG. 3 is perspective view of a frame work and support therefor for mounting a substrate to be painted upon the frame work.

Referring now to FIG. 3, a mounting device 45 such as tripod 32 having three legs 33 is employed to suspend substrate 14 in directed airstream 20'. For instance, substrate 14 to be painted is mounted upon mounting frame 13 wherein mounting frame 13 is supported on a gimbal 36 atop a support shaft 34 wherein support shaft 34 is movably mounted in a base 44 of mounting device 45. As mounting device 45 is adapted to be moved, preferably it is supported on a rigid support surface 46 adjacent outlet end 15 of tunnel 11 and thus proximate venturi 12. Directed airstream 20' then exits outlet end 15 of tunnel 11 carrying along medium from discharge ports 18 and as substrate 14 is supported adjacent outlet end 15 of tunnel 11, directed airstream 20' impinges upon substrate 14 leaving medium carried therewith to be deposited on substrate 14. As different medium are employed in the method of abstract artwork recited in the instant specification, abstract art is created having differing form, shape, line, color, texture, pattern and tone, Mounting device 45 may be made a part of outlet end 15 of tunnel 11, for instance suspended from outlet end 15 spaced a distance therefrom, however, mounting device 45 is preferably movable from outlet end 15 such that substrate 14 may be moved at least orthogonally along an axis 42 at disposed an angle 43 to axis 27 of directed airstream 20'. Thus, mounting device 45 is particularly useful as mounting device 45 may be moved manually or mounted upon a translatable platform for movement in any planar direction upon support surface 46. In the method of creating abstract artwork of this invention, mounting device 45 may be moved along an axis 42 parallel to axis 27 of directed airstream 20' in either direction thus moving substrate 14 to be painted substantially perpendicular to airstream 20'. Similarly, mounting device 45 may be moved parallel to axis 27 of directed airstream 20' thus changing the force with which medium carried by directed airstream 20' impinges upon substrate 14. Shaft 34 of mounting device 45 is also a telescopic shaft such that substrate 14 may be moved toward or away from support surface 46 to present another area of substrate 14 directly in directed airstream 20'. Furthermore, frame 13 of mounting device 45 may be moved simultaneously in all of these orthogonal directions by translating mounting device along axis 27 of directed airstream 20', along axis 42 transverse to directed airstream 20' and toward or away from support surface 46. Mounting device 45 may be manually moved in these orthogonal directions or may have power equipment made a part thereof to assist in these movements.

Frame 13 may comprise a rectangular support wherein substrate 14 is mounted upon a flat surface 38 of frame 13 wherein flat surface 38 is turned about an axis 39 passing through substrate 14 during passage of directed airstream 20' through venturi 12. Axis 39 is shown as passing through substrate 14 and frame 13 generally parallel to directed airstream 20', however, axis 39 may be disposed at any angle to substrate 14. In one instance, axis 39 is, in fact, directly parallel to axis 27 of directed airstream 20' and passing directly through the center of substrate 14 wherein the center of substrate 14 is directly in line with gimbal 36 of support shaft 34 and frame mount 35. Thus supported on gimbal 36, frame 13 with substrate 14 to be painted mounted thereon may be rotated about axis 39 such that side 47 is rotated to the position now occupied by bottom edge 48. Similarly, frame 13 may be rotated in the opposite direction or continuously rotated upon gimbal 36 about axis 39 throughout the period of time that directed airstream 20' is depositing medium upon substrate 14. In another instance, substrate 14 mounted upon a flat surface 38 is turned about an axis 40 parallel to substrate 14 during passage of undirected airstream 20 through venturi 12 by moving mounting device 45 in an are using axis 40 as a pivot. It is readily apparent here, that mounting device 45 may be moved in either direction about axis 40 and that axis 40 may be disposed at a distance from side edge 47, coincident therewith or wherein axis 40 lies on surface 41 of substrate 14. Though axis 40 is shown to be disposed adjacent one side 47 of frame 13, it is to be understood that axis 40 could be as easily disposed on the opposite side 51 thereof.

In a manner similar to the movement of mounting device 45 about axis 40, frame 13 or mounting device 45 may be moved about axis 42 wherein axis 42 may be spaced from flat surface 38 of substrate 14 to be painted. Thus, frame 13 may be angled with respect to directed airstream 20' such that top edge 49 is disposed at a different distance from outlet end 15 of tunnel 11 than the distance bottom edge 48 is disposed. As with axis 40, axis 42 may be coincident with either top edge 49 or bottom edge 48, upon flat surface 38 of substrate 14 to be painted or disposed at the center thereof wherein the center of flat surface 38 is substantially coincident with a location directly in front of gimbal 36. As frame 13 may be moved about any or all of axes 39, 40 and/or 42, a flat canvas used as substrate 14 could be angled with respect to directed airstream 20', flip-flopped from side 47 to side 51, tipped from top edge 49 to bottom edge 48 and/or translated orthogonally along axes 39, 40, 42.

Heretofore, mounting frame 13 has been described as having flat surface 38 upon in which substrate 14 to be Painted is disposed, however, mounting frame 13 may as easily have a curved surface 37, shown in dashed lines in FIG. 3, wherein frame 13 having curved surface 37 may be rotated about gimbal 36 during passage of directed airstream 20' through venturi 12. Likewise, mounting frame 13 may be translated along axes 39,40,42 or rotated thereabout whether individually or simultaneously. Though curved surface 37 is shown to be convex, curved surface 37 could be curved in all directions, thus spherical.

Airstream 20 of this invention is preferably artificially created by passage of vehicle 54 or animal before an inlet end 16 of tunnel 11 and most preferably is created by passage of vehicle 54 controlled by a selected participant in an automobile race such as a stock car race wherein the selected participant is a celebrity driver. Thus, abstract artwork may be created using the undirected airstream 20 created by the celebrity wherein the celebrity has authorized the commissioning of the artwork. It is believed that abstract artwork so created will be in great demand. In order to select the portion of artificially created undirected airstream 20 created by the selected driver, it is necessary to place a duct valve 50 at or near inlet end 16 of tunnel 11. Duct valve 50 is partially shown in FIG. 1 near inlet end 16 in the broken away portion of tunnel 11 and may be controlled by a handle (not shown) disposed through at least one wall 52 but duct valve 50 may be disposed in or adjacent to venturi 12. The artist/operator of apparatus 10 thus coordinates the opening of duct valve 50 with the passage of the selected participant such that tunnel 11 captures the undirected airstream 20 created by passage of vehicle 54 controlled by the selected participant. Having previously placed the particular discharge ports 18 in selected port locations 22 in low pressure zone 17 and selected the medium to be discharged through the discharge ports 18, the artist/operator then mounts substrate 14 to be painted on frame 13 and readies frame 13 for receiving directed airstream 20' and the medium from discharge ports 18 thereon. At the instant that the selected participant passes before inlet end 16, the artist/operator opens duct valve 50 for a defined period of time to capture the undirected airstream 20 created by the passage of vehicle 54 controlled by the selected participant. The artist/operator then closes duct valve 50 after the defined period of time. Apparatus 10 may also employ an electronic chronometer, lap counter race timer, camera and keyboard all connected to an electronic recording instrument wherein each abstract artwork created by passage of a selected participant may be imprinted with the pertinent data regarding the circumstances of the particular race including a picture of the automobile as it passes before inlet end 16. Preferably, the recorded electronic data is laser printed on surface 37, 38 upon completion of abstract artwork but may be imprinted on the reverse of substrate 14 as well as recorded on the picture of the automobile. Of course, the artist/operator of apparatus 10 may employ any or all of the techniques recited above to individualize each abstract artwork. For instance, the artist/operator may create several stages of one work of abstract art during a road race by repeatedly placing a particular frame 13 with a single substrate 14 to be painted upon mounting device 45 in order to capture several undirected airstreams 20 from the same selected participant. The artist/operator may vary the orientation of substrate 14 to be painted at each successive pass of the selected participant and record the orientation of substrate 14 at for the respective successive pass. Thus, substrate 14 to be painted may be mounted upon a curved surface 37 of frame 13 wherein curved surface 37 is rotated during the defined period of time and thereafter substrate 14 is mounted upon a flat surface 38 wherein flat surface 38 is turned about an axis 39 passing through substrate 14 during a subsequent defined period of time and finally, substrate 14 is mounted upon a flat surface 38 wherein flat surface 38 is turned about an axis 40 parallel to substrate 14 during yet another subsequent defined period of time. Also substrate 14 may be moved orthogonally along an axis 42 at an angle 43 to axis 27 of directed airstream 20' and/or rotated about axis 42 parallel to axis 27 of directed airstream 20' and/or translated upwardly, downwardly, right and/or left during application of medium being carried by directed airstream 20'. Curved surface 37 may be the surface of a rotating drum wherein substrate 14 to be painted is continuously supplied to curved surface 37 to produce an elongated abstract artwork.

It is readily apparent here that the artist/operator has a multitude of options available for creating a work of abstract art using the undirected airstream 20 of passing vehicle 54.

Likewise, the artist operator may create several works of abstract art during a road race by replacing substrate 14 to be painted on frame 13 with a new substrate 14 to be painted for several different selected participants or may have ready several frames 13 with different substrates 14 to be painted ready for mounting upon gimbal 36. Thus, the artist/operator of apparatus 10 may select the frame 13 having the next selected participant to pass inlet end 16 and mount frame 13 upon gimbal 36 for creating the abstract artwork for that particular pass of that selected participant.

In another alternative method, artificially created airstream 20 may be created by placing a box fan before an inlet end 16 of tunnel 11 wherein undirected airstream 20 passes through tunnel 11 and through venturi 12, picks up selected medium from discharge ports 18 in low pressure zone 17 and deposits at least a portion of the medium upon substrate 14 mounted on frame 13. Thus, apparatus 10 of this invention may be used in a studio to create abstract works of art. Other artificially created airstreams 20 may be substituted for the box fan recited above. For instance, inlet end 16 may be directed toward an open window or placed in the path of an oscillating fan or have a compressed air nozzle installed therein. For instance, undirected airstream 20 may be created by the passage of aircraft nearby, aircraft preparing for takeoff or taxi, horses, dogs or runners on a race track, an aerodynamic testing device or apparatus 10 may be mounted on or carried by any of the above. Additionally, vehicle 54 to be tested in an aerodynamic device may further be affixed with an air deflection device such that passage of air therearound creates a vortex 56 for capture by inlet end 16 of apparatus 10. Furthermore, it is contemplated that apparatus 10 may be mounted upon vehicle 54 to be passed through the atmosphere of the surroundings wherein apparatus 10 captures undirected airstream 20 in inlet end 16, directs undirected airstream 20 through apparatus 10 through a low pressure zone 17 thereof wherein paints, pigments or particles are carried by now directed airstream 20' toward a substrate 14 to be painted. Whether used in a studio or in a natural environment or at a man-made structure such as a race track, medium may be injected upstream or downstream into directed airstream 20' by pressurizing supply tube 21 such that medium being expelled therefrom is then carried by directed air stream 20' to substrate 14 to be painted. Though these examples have been herein recited, this invention is not limited thereto.

Materials for substrate 14 may include artist's canvas, Bristol board, paper, cloth, thermoplastic sheeting, metal, wood, glass, ceramic, plaster, statuary or other material used in creating works of art. Mounting of the various substrates 14 may be accomplished on a frame 13 suited for holding the particular material. In some instances, for instance with statuary, it is within the scope of this invention to support the statuary on a pedestal adjacent outlet end 15 of apparatus 10.

Apparatus 10 is preferably an elongated tunnel 11 having venturi 12 adjacent outlet end 15 thereof. Tunnel 11 may be constructed of metal, thermoplastic materials, cardboard or combinations thereof. Preferably, tunnel 11 has duct valve 50 disposed near inlet end 16 for opening and closing inlet end 16 as desired by the artist/operator. In low pressure zone 17 generally immediately after venturi 12, at least one port location 22 is disposed through wall 24 thereof, port location 22 adapted for receiving a discharge port 18 therein.

Discharge port 18 is preferably movable within port location 22 such that discharge port 18 may be moved across the exit throat 53 of venturi 12 from one side 24 to an opposite side 24. Alternately, as discharge port 18 is movable within port location 22, discharge port 18 may be removed from a given port location 22 and replaced in another port location 22.

Apparatus 10 has outlet end 15 disposed opposite inlet end 16 and preferably is directed toward substrate 14 to be painted. Outlet end 15 is preferably closely associated with venturi 12 as well as substrate 14. Substrate 14 is preferably mounted upon frame 13 wherein frame 13 is supported on mounting device 45, mounting device 45 resting upon a support surface 46. Medium to be deposited on substrate 14 is preferably supplied in containers 23 wherein each container 23 is connected to at least one discharge port 18 by at least one supply tube 21 though it is possible to connect at least one container 23 to multiple discharge ports 18 to provide for different effects to the work of abstract art created by apparatus 10 and the methods of this invention. Mounting device 45 is preferably movable upon support surface 46 and may be moved manually or supported on a separate movable structure such that substrate 14 may be moved orthogonally, rotated, tipped or a combination of these movements to provide for different presentations of substrate 14 to directed airstream 20'. Tunnel 11 of apparatus 10 is shown in FIG. 2 as being rectangular in cross section, however it is fully understood that the tunnel 11 may have a curved cross section, be triangular in cross section or be constructed of another cross section. Thus, apparatus 10 may be constructed to accommodate various types of substrates 14 to be painted and in fact, apparatus 10 may be made of a size and length to suit a particular substrate 14. Thus, the size, shape and use of apparatus 10 is not limited to the particular size, shape and use as shown in the accompanying figures.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. Apparatus for creating abstract artwork and abstract artwork created by said apparatus, said apparatus comprising means for discharging material into an airstream and a substrate for receiving said material wherein said airstream is established by a participant in a race, said airstream carrying said material therewith and directing said material toward said substrate, said substrate exposed to said airstream for a defined period of time.

2. Apparatus for creating abstract artwork and abstract artwork as in claim 1 wherein said material is carried by said participant.

3. Apparatus for creating abstract artwork and abstract artwork as in claim 2 wherein said material carried by said participant is discharged by said participant.

4. Apparatus for creating abstract artwork and abstract artwork as in claim 2 wherein said material carried by said participant is selected from the group comprising liquid paints, solid colorants, moisture, fuels and lubricants and waste materials.

5. Apparatus for creating abstract artwork and abstract artwork as in claim 3 wherein said material discharged by said participant is selected from the group comprising particulate matter, moisture, fuels, lubricants and waste materials.

6. Apparatus for creating abstract artwork and abstract artwork as in claim 1 wherein said substrate is selected from the group comprising artist's canvas, Bristol board, paper, cloth, thermoplastic sheeting, metal, wood, glass, ceramic, plaster or statuary.

7. Apparatus for creating abstract artwork and abstract artwork as in claim 6 wherein said substrate is carried by said participant.

8. Apparatus for creating abstract artwork and abstract artwork created by said apparatus, said apparatus comprising means for directing an undirected airstream into a directed airstream, discharge ports for introducing material into at least one said airstream and a substrate for receiving said material, said substrate disposed proximate a discharge end of said apparatus, said apparatus further comprising a tunnel having an inlet end and an outlet end, said tunnel containing a venturi between said inlet end and said outlet end, said apparatus carried by an entity passing through the environment wherein said inlet end of said tunnel captures a portion of an undirected airstream created by said entity passing through said environment in said inlet end, said tunnel directing said undirected airstream into a directed air stream through a low pressure zone proximate said venturi of said apparatus wherein material introduced into said apparatus through said discharge ports is carried by said directed air stream toward said substrate, at least a portion of said material deposited upon said substrate.

9. Apparatus for creating abstract artwork and abstract artwork as in claim 8 wherein said entity is selected from the group comprising persons, vehicles or animals.

10. Apparatus for creating abstract artwork and abstract artwork as in claim 9 wherein said substrate is selected from the group comprising artist's canvas, Bristol board, paper, cloth, thermoplastic sheeting, metal, wood, glass, ceramic, plaster or statuary.

11. Apparatus for creating abstract artwork and abstract artwork as in claim 8 wherein said material is discharged into said undirected airstream by said entity and carried by said airstream.

12. Apparatus for creating abstract artwork and abstract artwork as in claim 11 wherein said material is selected from the group comprising particulate matter, moisture, fuels, lubricants and waste materials.

13. Apparatus for creating abstract artwork and abstract artwork as in claim 11 wherein said material is carried by said entity and is discharged into said directed airstream into said venturi through at least one said discharge port.

14. Apparatus for creating abstract artwork and abstract artwork as in claim 13 wherein said material is selected from the group comprising liquid paints, solid colorants, introduced particulate matter, airborne particulate matter, moisture, fuels, lubricants and waste materials.

15. Apparatus for creating abstract artwork and abstract artwork as in claim 14 wherein said at least one said discharge port comprises multiple ports arranged randomly throughout said low pressure zone.

16. Apparatus for creating abstract artwork and abstract artwork as in claim 14 wherein said at least one discharge port comprises multiple ports arranged in rows along at least one wall of said low pressure zone.

17. Apparatus for creating abstract artwork and abstract artwork created by said apparatus, said apparatus comprising means for directing an undirected airstream into a directed airstream, discharge ports for introducing material into at least one said airstream and a substrate for receiving said material, said abstract artwork created by disposing a substrate proximate a discharge end of said apparatus, said apparatus further comprising a tunnel having an inlet end and an outlet end, said tunnel containing a venturi between said inlet end and said outlet end, said apparatus mounted at a stationary location wherein said tunnel captures a portion of an undirected airstream in said inlet end, said tunnel directing said undirected airstream into a directed air stream through a low pressure zone proximate said venturi of said apparatus wherein material introduced into said apparatus is carried by said directed air stream toward said substrate, at least a portion of said material deposited upon said substrate.

18. Apparatus for creating, abstract artwork and abstract artwork as in claim 17 wherein said stationary location is selected from the group comprising a studio, a wall of a race track, an airport barrier and an aerodynamic testing device.

19. Apparatus for creating abstract artwork and abstract artwork as in claim 18 wherein said airstream is selected from the group comprising a naturally occurring airstream, an airstream created by passage of an entity proximate said apparatus, an airstream created by a mechanical air mover and an airstream created by a compressed air nozzle.

20. Apparatus for creating abstract artwork and abstract artwork as in claim 19 wherein said material is selected from the group comprising liquid paints, solid colorants, introduced particulate matter, airborne particulate matter, moisture, fuels, lubricants and waste materials.

* * * * *